US012148269B2

(12) United States Patent
Huke et al.

(10) Patent No.: US 12,148,269 B2
(45) Date of Patent: *Nov. 19, 2024

(54) POINT OF VIEW BASED WAGER AVAILABILITY

(71) Applicant: AdrenalineIP, Washington, DC (US)

(72) Inventors: Casey Alexander Huke, Washington, DC (US); John Cronin, Jericho, VT (US); Joseph W. Beyers, Saratoga, CA (US); Michael D'Andrea, Burlington, VT (US)

(73) Assignee: AdrenalineIP, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/353,241

(22) Filed: Jul. 17, 2023

(65) Prior Publication Data

US 2023/0360496 A1 Nov. 9, 2023

Related U.S. Application Data

(63) Continuation of application No. 17/239,879, filed on Apr. 26, 2021, now Pat. No. 11,715,352, which is a continuation of application No. 17/101,461, filed on Nov. 23, 2020, now Pat. No. 11,024,126.

(60) Provisional application No. 63/107,665, filed on Oct. 30, 2020.

(51) Int. Cl.
*G07F 17/32* (2006.01)

(52) U.S. Cl.
CPC ...... *G07F 17/3288* (2013.01); *G07F 17/3225* (2013.01)

(58) Field of Classification Search
CPC . G06F 17/3288; G06F 17/3225; G06F 17/323
USPC .......................................................... 463/25
See application file for complete search history.

(56) References Cited

U.S. PATENT DOCUMENTS

| | | | | |
|---|---|---|---|---|
| 2017/0255828 A1* | 9/2017 | Chang | | H04N 21/44008 |
| 2020/0074181 A1* | 3/2020 | Chang | | H04N 21/8456 |
| 2020/0074182 A1* | 3/2020 | Chang | | H04N 21/44008 |
| 2020/0236288 A1* | 7/2020 | Schwartz | | G06V 20/42 |

OTHER PUBLICATIONS

International Search Report and Written Opinion issued on Dec. 8, 2021, in corresponding International Application No. PCT/US2021/057004, 7 pages.

* cited by examiner

*Primary Examiner* — Pierre E Elisca
(74) *Attorney, Agent, or Firm* — Maier & Maier, PLLC

(57) ABSTRACT

A method of displaying a subset of all available wagers on the different possible outcomes for a play inside of a live sporting event that is dependent upon the portion of the game the user is watching so that the user may view available wagers and the live sporting event on the same display.

8 Claims, 4 Drawing Sheets

| Available wagers | | | | |
|---|---|---|---|---|
| **POV** | **Game** | **Player** | **Outcome** | **Odds** |
| Batter | NYY vs LAD | A. Judge | Single | 4/1 |
| Batter | NYY vs LAD | A. Judge | Double | 5/1 |
| Batter | NYY vs LAD | A. Judge | Homerun | 3/1 |
| Pitcher | NYY vs LAD | C. Kershaw | Strikeout | 4/1 |
| Catcher | NYY vs LAD | C. Kershaw | Strike | 3/1 |
| Catcher | NYY vs LAD | C. Kershaw | Ball | 2/1 |
| Catcher | NYY vs LAD | C. Kershaw | Pitch Count over 4 | 3/1 |
| Field | NYY vs LAD | A. Judge | Single | 4/1 |
| Field | NYY vs LAD | A. Judge | Homerun | 5/1 |
| Field | NYY vs LAD | C. Kershaw | Catch | 3/1 |
| Stump | IND vs AUS | V. Kohli | Single | 2/1 |
| Stump | IND vs AUS | V. Kohli | Double | 4/1 |
| Stump | IND vs AUS | V. Kohli | Six | 3/1 |
| Bowler | IND vs AUS | M. Starc | Wicket | 2/1 |
| Bowler | IND vs AUS | M. Starc | Dot ball | 3/1 |
| Bowler | IND vs AUS | M. Starc | Maiden over | 4/1 |
| Field | IND vs AUS | M. Starc | Catch | 4/1 |
| Field | IND vs AUS | M. Starc | Misfield | 2/1 |
| Field | IND vs AUS | M. Starc | Direct Throw | 3/1 |
| Field | IND vs AUS | M. Starc | Misfield | 2/1 |
| Field | IND vs AUS | M. Starc | Direct Throw | 3/1 |

Fig. 2

POINT OF VIEW BASED WAGER AVAILABILITY

CROSS-REFERENCE TO RELATED APPLICATIONS

The present patent application is a continuation of U.S. patent application Ser. No. 17/239,879, filed on Apr. 26, 2021, which is a continuation and claims benefit and priority to U.S. patent application Ser. No. 17/101,461 entitled "POINT OF VIEW BASED WAGER AVAILABILITY" filed on Nov. 23, 2020, and U.S. Provisional Patent Application No. 63/107,665 entitled "POINT OF VIEW BASED WAGER AVAILABILITY" filed on Oct. 30, 2020, which is hereby incorporated by reference into the present disclosure.

FIELD

The embodiments are generally related to wagering on live sporting events, such as play by play wagering and its interaction with the viewing of that live event on a mobile device.

BACKGROUND

With the U.S. Supreme Court invalidating the 1992 Professional and Amateur Sports Protection Act, legalizing sports gambling, there will be a proliferations of online platforms that allow users to wager on sports through their mobile devices.

When wagering on a sporting event or portion of a sporting event, it is important to have the information a user relies upon to make their decisions readily available. There is simply too much information to be able to fit all the relevant data on the screen with the sporting event.

There are numerous possible outcomes for individual plays inside of a live sporting event. It is not practical to present all the available wagers to a user on a screen that is also how the user is viewing the live sporting event.

SUMMARY

Embodiments include methods, systems, and apparatuses for providing data and wagers based on a point of view of a device or user. One embodiment includes a method of wagering on a prediction of a single play in a live sporting event, including receiving data from a live sporting event upon which wagers can be placed on plays inside of that live sporting event, displaying the live sporting event, and displaying available wagers based on a point of view of a display point of view of the live sporting event.

Another embodiment provides a method of displaying available wagers for a single play in a live sporting event, including executing on a processor the steps of:

- displaying a live sporting event;
- displaying one or more available first wagers based upon a point of view of the displayed live sporting event; and
- displaying one or more second wagers based upon a change of the point of view of the displayed live sporting event.

Still another embodiment provides a system for wagering on a single play in a live sporting event, including:

- a display device that displays a live sporting event;
- an odds database that stores odds for single plays in the live sporting event, the odds associated with a point of view of the display of the live sporting event; and

- one or more available first wagers presented on the display device based on the point of view of the display of the live sporting event.

BRIEF DESCRIPTIONS OF THE DRAWINGS

The accompanying drawings illustrate various embodiments of systems, methods, and various other aspects of the embodiments. Any person with ordinary skills in the art will appreciate that the illustrated element boundaries (e.g. boxes, groups of boxes, or other shapes) in the figures represent an example of the boundaries. It may be understood that, in some examples, one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

FIG. 2 illustrates an odds database, according to an embodiment.

DETAILED DESCRIPTION

Figure 1:
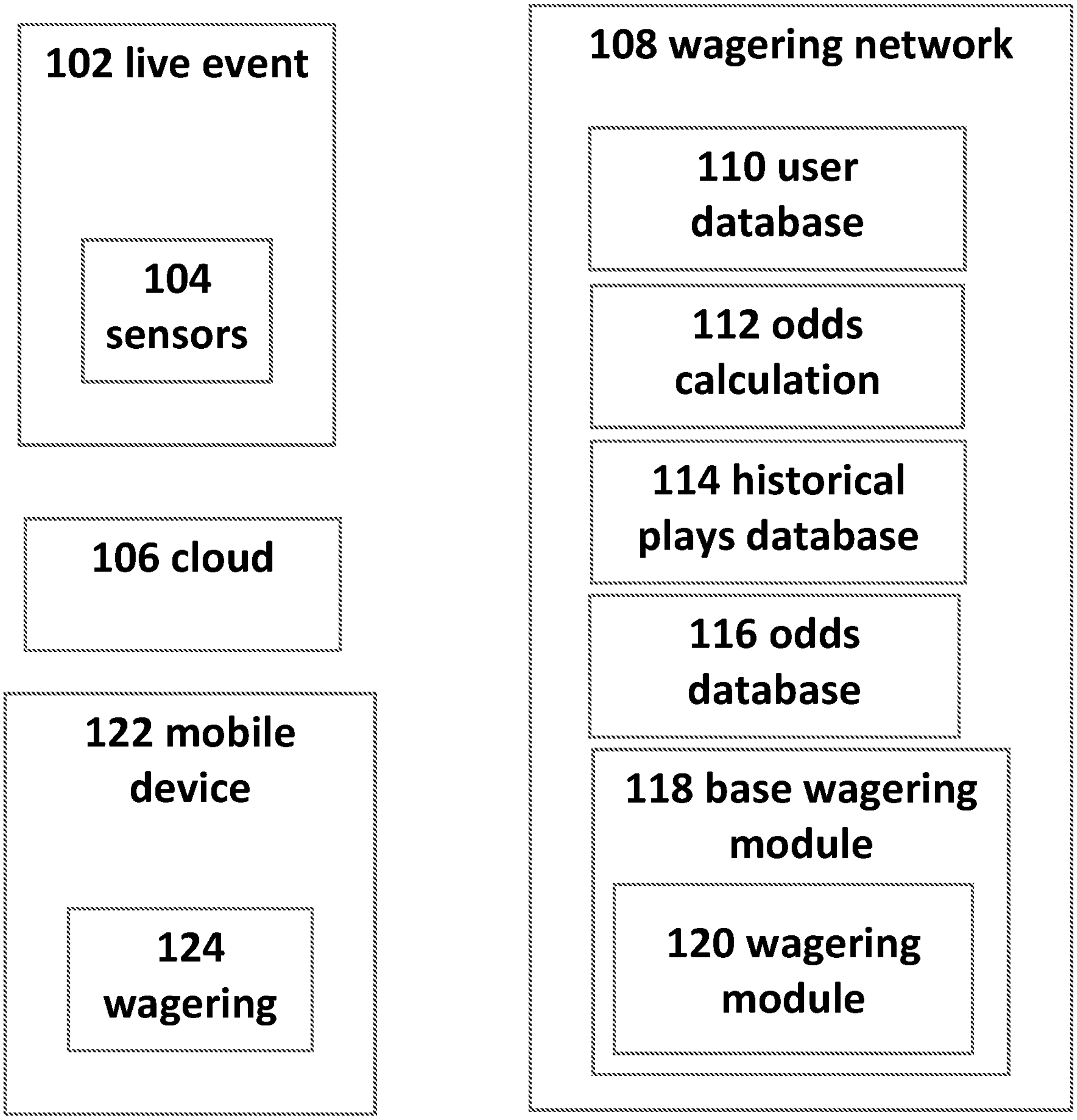
FIG. 1 illustrates a point of view-based wager availability, according to an embodiment.

Aspects of the present invention are disclosed in the following description and related figures directed to specific embodiments of the invention. Those of ordinary skill in the art will recognize that alternate embodiments may be devised without departing from the spirit or the scope of the claims. Additionally, well-known elements of exemplary embodiments of the invention will not be described in detail or will be omitted so as not to obscure the relevant details of the invention As used herein, the word exemplary means serving as an example, instance or illustration. The embodiments described herein are not limiting, but rather are exemplary only. It should be understood that the described embodiments are not necessarily to be construed as preferred or advantageous over other embodiments. Moreover, the terms embodiments of the invention, embodiments or invention do not require that all embodiments of the invention include the discussed feature, advantage, or mode of operation.

Further, many of the embodiments described herein are described in terms of sequences of actions to be performed by, for example, elements of a computing device. It should be recognized by those skilled in the art that the various sequence of actions described herein can be performed by specific circuits (e.g., application specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in a number of different forms, all of which have been contemplated to be within the scope of the claimed subject matter. In addition, for each of the embodiments described herein, the corresponding form of any such embodiments may be described herein as, for example, a computer configured to perform the described action.

With respect to the embodiments, a summary of terminology used herein is provided.

An action refers to a specific play or specific movement in a sporting event. For example, an action may determine which players were involved during a sporting event. In some embodiments, an action may be a throw, shot, pass, swing, kick, hit, performed by a participant in a sporting event. In some embodiments, an action may be a strategic decision made by a participant in the sporting event such as a player, coach, management, etc. In some embodiments, an action may be a penalty, foul, or type of infraction occurring in a sporting event. In some embodiments, an action may include the participants of the sporting event. In some embodiments, an action may include beginning events of sporting event, for example opening tips, coin flips, opening pitch, national anthem singers, etc. In some embodiments, a sporting event may be football, hockey, basketball, baseball, golf, tennis, soccer, cricket, rugby, MMA, boxing, swimming, skiing, snowboarding, horse racing, car racing, boat racing, cycling, wrestling, Olympic sport, eSports, etc. Actions can be integrated into the embodiments in a variety of manners.

A “bet” or “wager” is to risk something, usually a sum of money, against someone else’s or an entity on the basis of the outcome of a future event, such as the results of a game or event. It may be understood that non-monetary items may be the subject of a “bet” or “wager” as well, such as points or anything else that can be quantified for a “wager” or “bet.” A bettor refers to a person who bets or wagers. A bettor may also be referred to as a user, client, or participant throughout the present invention. A “bet” or “wager” could be made for obtaining or risking a coupon or some enhancements to the sporting event, such as better seats, VIP treatment, etc. A “bet” or “wager” can be done for certain amount or for a future time. A “bet” or “wager” can be done for being able to answer a question correctly. A “bet” or “wager” can be done within a certain period of time. A “bet” or “wager” can be integrated into the embodiments in a variety of manners.

A “book” or “sportsbook” refers to a physical establishment that accepts bets on the outcome of sporting events. A “book” or “sportsbook” system enables a human working with a computer to interact, according to set of both implicit and explicit rules, in an electronically powered domain for the purpose of placing bets on the outcome of sporting event. An added game refers to an event not part of the typical menu of wagering offerings, often posted as an accommodation to patrons. A “book” or “sportsbook” can be integrated into the embodiments in a variety of manners.

To “buy points” means a player pays an additional price (more money) to receive a half-point or more in the player’s favor on a point spread game. Buying points means you can move a point spread, for example up to two points in your favor. “Buy points” can be integrated into the embodiments in a variety of manners.

The “price” refers to the odds or point spread of an event. To “take the price” means betting the underdog and receiving its advantage in the point spread. “Price” can be integrated into the embodiments in a variety of manners.

“No action” means a wager in which no money is lost or won, and the original bet amount is refunded. “No action” can be integrated into the embodiments in a variety of manners.

The “sides” are the two teams or individuals participating in an event: the underdog and the favorite. The term “favorite” refers to the team considered most likely to win an event or game. The “chalk” refers to a favorite, usually a heavy favorite. Bettors who like to bet big favorites are referred to “chalk eaters” (often a derogatory term). An event or game in which the sports book has reduced its betting limits, usually because of weather or the uncertain status of injured players is referred to as a “circled game.” “Laying the points or price” means betting the favorite by giving up points. The term “dog” or “underdog” refers to the team perceived to be most likely to lose an event or game. A “longshot” also refers to a team perceived to be unlikely to win an event or game. “Sides”, “favorite”, “chalk”, “circled game”, “laying the points price”, “dog” and “underdog” can be integrated into the embodiments in a variety of manners.

The “money line” refers to the odds expressed in terms of money. With money odds, whenever there is a minus (−) the player “lays” or is “laying” that amount to win (for example $100); where there is a plus (+) the player wins that amount for every $100 wagered. A “straight bet” refers to an individual wager on a game or event that will be determined by a point spread or money line. The term “straight-up” means winning the game without any regard to the “point spread”; a “money-line” bet. “Money line”, “straight bet”, “straight-up” can be integrated into the embodiments in a variety of manners.

The “line” refers to the current odds or point spread on a particular event or game. The “point spread” refers to the margin of points in which the favored team must win an event by to “cover the spread.” To “cover” means winning by more than the “point spread”. A handicap of the “point spread” value is given to the favorite team so bettors can choose sides at equal odds. “Cover the spread” means that a favorite win an event with the handicap considered or the underdog wins with additional points. To “push” refers to when the event or game ends with no winner or loser for wagering purposes, a tie for wagering purposes. A “tie” is a wager in which no money is lost or won because the teams’ scores were equal to the number of points in the given “point spread”. The “opening line” means the earliest line posted for a particular sporting event or game. The term “pick” or “pick 'em” refers to a game when neither team is favored in an event or game. “Line”, “cover the spread”, “cover”, “tie”, “pick” and “pick-em” can be integrated into the embodiments in a variety of manners.

To “middle” means to win both sides of a game; wagering on the “underdog” at one point spread and the favorite at a different point spread and winning both sides. For example, if the player bets the underdog +4½ and the favorite −3½ and the favorite wins by 4, the player has middled the book and won both bets. “Middle” can be integrated into the embodiments in a variety of manners.

Digital gaming refers to any type of electronic environment that can be controlled or manipulated by a human user for entertainment purposes. A system that enables a human and a computer to interact according to set of both implicit and explicit rules, in an electronically powered domain for the purpose of recreation or instruction. “eSports” refers to a form of sports competition using video games, or a multiplayer video game played competitively for spectators, typically by professional gamers. Digital gaming and “eSports” can be integrated into the embodiments in a variety of manners.

The term event refers to a form of play, sport, contest, or game, especially one played according to rules and decided by skill, strength, or luck. In some embodiments, an event may be football, hockey, basketball, baseball, golf, tennis, soccer, cricket, rugby, MMA, boxing, swimming, skiing, snowboarding, horse racing, car racing, boat racing, cycling, wrestling, Olympic sport, etc. Event can be integrated into the embodiments in a variety of manners.

The "total" is the combined number of runs, points or goals scored by both teams during the game, including overtime. The "over" refers to a sports bet in which the player wagers that the combined point total of two teams will be more than a specified total. The "under" refers to bets that the total points scored by two teams will be less than a certain figure. "Total", "over", and "under" can be integrated into the embodiments in a variety of manners.

A "parlay" is a single bet that links together two or more wagers; to win the bet, the player must win all the wagers in the "parlay". If the player loses one wager, the player loses the entire bet. However, if he wins all the wagers in the "parlay", the player wins a higher payoff than if the player had placed the bets separately. A "round robin" is a series of parlays. A "teaser" is a type of parlay in which the point spread, or total of each individual play is adjusted. The price of moving the point spread (teasing) is lower payoff odds on winning wagers. "Parlay", "round robin", "teaser" can be integrated into the embodiments in a variety of manners.

A "prop bet" or "proposition bet" means a bet that focuses on the outcome of events within a given game. Props are often offered on marquee games of great interest. These include Sunday and Monday night pro football games, various high-profile college football games, major college bowl games and playoff and championship games. An example of a prop bet is "Which team will score the first touchdown?" "Prop bet" or "proposition bet" can be integrated into the embodiments in a variety of manners.

A "first-half bet" refers to a bet placed on the score in the first half of the event only and only considers the first half of the game or event. The process in which you go about placing this bet is the same process that you would use to place a full game bet, but as previously mentioned, only the first half is important to a first-half bet type of wager. A "half-time bet" refers to a bet placed on scoring in the second half of a game or event only. "First-half-bet" and "half-time-bet" can be integrated into the embodiments in a variety of manners.

A "futures bet" or "future" refers to the odds that are posted well in advance on the winner of major events, typical future bets are the Pro Football Championship, Collegiate Football Championship, the Pro Basketball Championship, the Collegiate Basketball Championship, and the Pro Baseball Championship. "Futures bet" or "future" can be integrated into the embodiments in a variety of manners.

The "listed pitchers" is specific to a baseball bet placed only if both of the pitchers scheduled to start a game actually start. If they don't, the bet is deemed "no action" and refunded. The "run line" in baseball, refers to a spread used instead of the money line. "Listed pitchers" and "no action" and "run line" can be integrated into the embodiments in a variety of manners.

The term "handle" refers to the total amount of bets taken. The term "hold" refers to the percentage the house wins. The term "juice" refers to the bookmaker's commission, most commonly the 11 to 10 bettors lay on straight point spread wagers: also known as "vigorish" or "vig". The "limit" refers to the maximum amount accepted by the house before the odds and/or point spread are changed. "Off the board" refers to a game in which no bets are being accepted. "Handle", "juice", vigorish", "vig" and "off the board" can be integrated into the embodiments in a variety of manners.

"Casinos" are a public room or building where gambling games are played. "Racino" is a building complex or grounds having a racetrack and gambling facilities for playing slot machines, blackjack, roulette, etc. "Casino" and "Racino" can be integrated into the embodiments in a variety of manners.

Customers are companies, organizations or individual that would deploy, for fees, and may be part of, of perform, various system elements or method steps in the embodiments.

Managed service user interface service is a service that can help customers (1) manage third parties, (2) develop the web, (3) do data analytics, (4) connect thru application program interfaces and (4) track and report on player behaviors. A managed service user interface can be integrated into the embodiments in a variety of manners.

Managed service risk management services are a service that assists customers with (1) very important person management, (2) business intelligence, and (3) reporting. These managed service risk management services can be integrated into the embodiments in a variety of manners.

Managed service compliance service is a service that helps customers manage (1) integrity monitoring, (2) play safety, (3) responsible gambling and (4) customer service assistance. These managed service compliance services can be integrated into the embodiments in a variety of manners.

Managed service pricing and trading service is a service that helps customers with (1) official data feeds, (2) data visualization and (3) land based, on property digital signage. These managed service pricing and trading services can be integrated into the embodiments in a variety of manners.

Managed service and technology platform are services that helps customers with (1) web hosting, (2) IT support and (3) player account platform support. These managed service and technology platform services can be integrated into the embodiments in a variety of manners.

Managed service and marketing support services are services that help customers (1) acquire and retain clients and users, (2) provide for bonusing options and (3) develop press release content generation. These managed service and marketing support services can be integrated into the embodiments in a variety of manners.

Payment processing services are those services that help customers that allow for (1) account auditing and (2) withdrawal processing to meet standards for speed and accuracy. Further, these services can provide for integration of global and local payment methods. These payment processing services can be integrated into the embodiments in a variety of manners.

Engaging promotions allow customers to treat your players to free bets, odds boosts, enhanced access and flexible cashback to boost lifetime value. Engaging promotions can be integrated into the embodiments in a variety of manners.

"Cash out" or "pay out" or "payout" allow customers to make available, on singles bets or accumulated bets with a partial cash out where each operator can control payouts by managing commission and availability at all times. The "cash out" or "pay out" or "payout" can be integrated into the embodiments in a variety of manners, including both monetary and non-monetary payouts, such as points, prizes, promotional or discount codes, and the like.

"Customized betting" allow customers to have tailored personalized betting experiences with sophisticated tracking and analysis of players' behavior. "Customized betting" can be integrated into the embodiments in a variety of manners.

Kiosks are devices that offer interactions with customers clients and users with a wide range of modular solutions for both retail and online sports gaming. Kiosks can be integrated into the embodiments in a variety of manners.

Business Applications are an integrated suite of tools for customers to manage the everyday activities that drive sales, profit, and growth, from creating and delivering actionable insights on performance to help customers to manage the sports gaming. Business Applications can be integrated into the embodiments in a variety of manners.

State based integration allows for a given sports gambling game to be modified by states in the United States or countries, based upon the state the player is in, based upon mobile phone or other geolocation identification means. State based integration can be integrated into the embodiments in a variety of manners.

Game Configurator allow for configuration of customer operators to have the opportunity to apply various chosen or newly created business rules on the game as well as to parametrize risk management. Game configurator can be integrated into the embodiments in a variety of manners.

"Fantasy sports connector" are software connectors between method steps or system elements in the embodiments that can integrate fantasy sports. Fantasy sports allow a competition in which participants select imaginary teams from among the players in a league and score points according to the actual performance of their players. For example, if a player in a fantasy sports is playing at a given real time sports, odds could be changed in the real time sports for that player.

Software as a service (or SaaS) is a method of software delivery and licensing in which software is accessed online via a subscription, rather than bought and installed on individual computers. Software as a service can be integrated into the embodiments in a variety of manners.

Synchronization of screens means synchronizing bets and results between devices, such as TV and mobile, PC and wearables. Synchronization of screens can be integrated into the embodiments in a variety of manners.

Automatic content recognition (ACR) is an identification technology to recognize content played on a media device or present in a media file. Devices containing ACR support enable users to quickly obtain additional information about the content they see without any user-based input or search efforts. To start the recognition, a short media clip (audio, video, or both) is selected. This clip could be selected from within a media file or recorded by a device. Through algorithms such as fingerprinting, information from the actual perceptual content is taken and compared to a database of reference fingerprints, each reference fingerprint corresponding to a known recorded work. A database may contain metadata about the work and associated information, including complementary media. If the fingerprint of the media clip is matched, the identification software returns the corresponding metadata to the client application. For example, during an in-play sports game a "fumble" could be recognized and at the time stamp of the event, metadata such as "fumble" could be displayed. Automatic content recognition (ACR) can be integrated into the embodiments in a variety of manners.

Joining social media means connecting an in-play sports game bet or result to a social media connection, such as a FACEBOOK® chat interaction. Joining social media can be integrated into the embodiments in a variety of manners.

Augmented reality means a technology that superimposes a computer-generated image on a user's view of the real world, thus providing a composite view. In an example of this invention, a real time view of the game can be seen and a "bet" which is a computer-generated data point is placed above the player that is bet on. Augmented reality can be integrated into the embodiments in a variety of manners.

Some embodiments of this disclosure, illustrating all its features, will now be discussed in detail. It can be understood that the embodiments are intended to be open ended in that an item or items used in the embodiments is not meant to be an exhaustive listing of such item or items, or meant to be limited to only the listed item or items.

It can be noted that as used herein and in the appended claims, the singular forms "a," "an," and "the" include plural references unless the context clearly dictates otherwise. Although any systems and methods similar or equivalent to those described herein can be used in the practice or testing of embodiments, only some exemplary systems and methods are now described.

FIG. 1 is a system for in-play wagering through a wagering network 108. This system is comprised of a live event 102, for example, a sporting event such as a football game, a basketball game, a hockey game, a tennis match, golf tournament, eSports or digital game, etc. The live event 102 will include some number of actions or plays, upon with a user or bettor or customer can place a bet or wager, typically through an entity called a sportsbook. There are numerous types of wagers the bettor can make, including, a straight bet, a money line bet, a bet with a point spread or line that bettor's team would need to cover if the result of the game with the same as the point spread the user would not cover the spread, but instead the tie is called a push. If the user is betting on the favorite, they are giving points to the opposing side, which is the underdog or longshot. Betting on all favorites is referred to as chalk, this is typically applied to round-robin, or other styles of tournaments. There are other types of wagers, including parlays, teasers and prop bets, that are added games, that often allow the user to customize their betting, by changing the odds and pay-outs they receive on a wager. Certain sportsbooks will allow the bettor to buy points, to move the point spread off of the opening line, this will increase the price of the bet, sometimes by increasing the juice, vig, or hold that the sportsbook takes. Another type of wager the bettor can make is an over/under, in which the user bets over or under a total for the live event 102, such as the score of American football or the run line in baseball, or a series of actions in the live event 102. Sportsbooks have a number of bets they can handle and a limit of wagers they can take on either side of a bet before they will move the line or odds off of the opening line. Additionally, there are circumstances, such an injury to an important player such as a listed pitcher, in which a sportsbook, casino or racino will take an available wager off the board. As the line moves there becomes an opportunity for a bettor to bet on both sides at different point spreads to middle and win both bets. Sportsbooks will often offer bets on portions of games, such as first half bets and half-time bets. Additionally, the sportsbook can offer futures bets on live events 102 in the future. Sportsbooks need to offer payment processing services to cash out customers. This can be done at kiosks at the live event 102 or another location. For example, consider a live event 102 being a baseball game that is played between the New York Yankees and the Los Angeles Dodgers, at Yankee Stadium, New York City.

Further, embodiments may include a plurality of sensors 104 that may be used such as motion sensors, temperature sensors, humidity sensors, cameras such as an RGB-D camera which is a digital camera capturing color (RGB) and depth information for every pixel in an image, microphones, a radiofrequency receiver, a thermal imager, a radar device, a LIDAR device, an ultrasound device, a speaker, wearable devices etc. Also, the plurality of sensors 104 may include tracking devices, such as RFID tags, GPS chips or other such devices embedded on uniforms, in equipment, in the field of play, in the boundaries of the field of play, or other markers on the field of play. Imaging devices may also be used as tracking devices such as player tracking that collects statistical information through real-time X, Y positioning of players and X, Y, Z positioning of the ball. In the example of baseball game, the plurality of sensors 104 may be used for capturing parameters such as spin rate of the ball, ball positions, launch angle, and exit velocity.

Further, embodiments may include a cloud 106 or communication network may be a wired and/or a wireless network. The communication network, if wireless, may be implemented using communication techniques such as Visible Light Communication (VLC), Worldwide Interoperability for Microwave Access (WiMAX), Long Term Evolution (LTE), Wireless Local Area Network (WLAN), Infrared (IR) communication, Public Switched Telephone Network (PSTN), Radio waves, and other communication techniques known in the art. The communication network may allow ubiquitous access to shared pools of configurable resources and higher-level services that can be rapidly provisioned with minimal management effort, which may occur over internet and relies on sharing of resources to achieve coherence and economies of scale, like a public utility, while third-party clouds enable organizations to focus on their core businesses instead of expending resources on computer infrastructure and maintenance. The cloud 106 may be communicatively coupled to the wagering network 108 which may perform real time analysis on the type of play and the result of the play. The cloud 106 may also be synchronized with game situational data, such as the time of the game, the score, location on the field, weather conditions, and the like which may affect the choice of play utilized. For example, in some embodiments, the cloud 106 may not receive data gathered from sensors and may, instead, receive data from an alternative data feed, such as SportsRadar®. This data may be compiled substantially immediately following the completion of any play and the data from this feed may be compared with a variety of team data and league data based on a variety of elements, including down, possession, score, time, team, and so forth, as described in various embodiments herein.

Further, embodiments may include the wagering network 108 which may perform real-time analysis on the type of play and the result of a play or action. The wagering network 108 (or cloud 106) may also be synchronized with game situational data, such as the time of the game, the score, location on the field, weather conditions, and the like which may affect the choice of play utilized. For example, in other embodiments, the wagering network 108 may not receive data gathered from sensors and may, instead, receive data from an alternative data feed, such as SportsRadar®. This data may be compiled substantially immediately following the completion of any play and the data from this feed may be compared with a variety of team data and league data based on a variety of elements, including down, possession, score, time, team, and so forth, as described in various embodiments herein. The wagering network 108 can offer a number of software as a service managed services such as, user interface service, risk management service, compliance, pricing and trading service, IT support of the technology platform, business applications, game configuration, state-based integration, integration to allow the joining of social media, as well as marketing support services that can create engaging promotions to the user. In one embodiment, the wagering network 108, via a wagering app 124, may facilitate settlement options to the user. In another embodiment, the wagering network 108 may use third party balance settlement apps. For example, the wagering app 124 may use Paypal for settlement of the balances of the user.

Further, embodiments may utilize a user database 110 which contains data relevant to all users of the wagering network 108, which may include, a user ID, a device identifier, a paired device identifier, wagering history, and wallet information for the user. The user database 110 may also contain a list of user account records associated with a respective user ID. For example, a user account record may include information such as user interests, user personal details such as age, mobile number, etc., sporting events played before, highest wager, favorite sporting event, and current user standings and balance corresponding to the user ID. In addition, the user database 110 may contain betting lines and search queries. The user database 110 may be searched based on a search criteria received from the user. Each betting line may include a plurality of betting attributes such as at least one of the live event 102, a team, a player, an amount of wager, etc. The user database 110 may include information related to all the users involved in the live event 102. In an exemplary embodiment, the user database 110 may include information for generating a user authenticity report and a wagering verification report. Further, the user database 110 may be used to store user statistics like, but not limited to, retention period for a particular user, frequency of wagers placed by a particular user, or average amount of wager placed by each user.

Further, embodiments may include an odds calculation module 112 which utilizes information from a historical plays database 114 and the information from the sensor feeds 104 to calculate odds for in-play wagers. The information from the historical plays database 114 may include data related to the type of the play, the previous information related to players involved in the live event 102, and results of the previous live events 102. The odds for each live event 102, such as in a baseball game, a particular player hitting a home run, a single, or a strikeout, may be calculated based on the information received from the sensor feeds from the plurality of sensors 104 and the previous information related to the particular player. Further, the odds may be updated based on in-game events (for example, a player strikes a home run with a pitcher, decreasing his odds of getting a strikeout from the same pitcher). The odds may be calculated or adjusted based on statistical information related to the live event 102 and the statistical information of the players. For example, the odds may be determined based on the historical data such as prior performance information about a player (like batting average against a certain pitcher, earned run average, catch probability, hamstring strain), and physiological information of player(s) etc., and current i.e. real-time information, such as current confidence level etc. In one embodiment, the type of wagering may depend on the type of game being played. In one embodiment, the odds calculation module 112 may determine the available wagers to the user. The odds calculation module 112 may also utilize a probability engine, which assembles all the historical data and real-time data and produces the odds (stored in the odds database 116) for in-play wagers. Thus, the odds calculation module 112 stores information relevant to all the potential outcomes, as available wagers, which facilitates the user with better knowledge to make certain judgements about the potential performance of players in each live event 102 and place a calculated wager with a potential return on the wager. For example, in the baseball game, the odds calculation module 112 may calculate odds related to the possible outcomes of an at-bat for Aaron Judge of the New York Yankees hitting against Clayton Kershaw of the LA Dodgers, such that the odds of hitting a single are 4/1, hitting a double are 5/1, and hitting a home run are 3/1.

Further, embodiments may utilize the historical plays database 114 that contains play data for the type of sport being played in the live event 102. In one embodiment, for optimal odds calculation, the historical play data may include metadata about the historical plays, such as, but not limited to, the time of the live event 102, location, weather, previous plays, opponent, physiological data of the players (including blood pressure, pulse rate, and respiration rate), batting average of all players, information related to the players such as injuries in the past, batting average, earned run average, catch probability, spin rate, launch angle, exit velocity, a bunt, a single, a double, a triple, a home run, a caught, a fly ball, information related to trainers of each player, etc. For example, in the baseball game, information stored in the historical plays database 114 may include information related to the previous baseball games played by the New York Yankees such as, but not limited to, the weather condition, i.e. during the match, it was cloudy.

Further, embodiments may utilize the odds database 116 that contains the odds calculated by the odds calculation module 112. The odds may represent the potential outcomes on the next play. The odds database 116 may store odds which are categorized based on a point of view (POV) of the live event 102, and are displayed to the user. In one embodiment, artificial intelligence (AI) technology may be used to categorize the odds based on the POV of the live event 102. It can be noted that the POV may be selected by the user. Further, the odds database 116 may store the list of odds associated with the respective POV. For example, while watching a baseball game, the live event 102 may be presented in a field view, a batter view, a pitcher view, and a catcher view. In one embodiment, the odds database 116 may store odds related to the field view, for example, odds related to the overall match such as odds of winning a match, odds related to the pitcher, odds related to the batter (scoring a single/double/homerun). In another embodiment, the odds database 116 may store odds related to the batter view. For example, the batter view may facilitate showing odds for scoring a single or a double or a triples or a home run in an innings or a match. In another embodiment, the odds database 116 may store odds related to the pitcher view, such as odds of walk per hits in an innings/match, number of strikeouts in an innings or match, K/BB (number of strike-out-to-walk ratio) in an innings/match, etc. In another embodiment, the odds database 116 may store odds related to the catcher view, including odds related to the catcher such as the odds of catching, allowing a pass ball, etc. Further, the odds database 116 may store all the odds to be displayed on the mobile device 122.

Further, embodiments may include a base wagering module 118 that allows the user to place in-play wagers. The base wagering module 118 may allow the user to log-in/sign-in to the wagering network 108 through the wagering app 124 on the mobile device 122, during the live event 102. After logging in to the wagering app 124, the base wagering module 118 may retrieve all available wagers related to the live event 102, from the odds database 116. For example, the base wagering module 118 receives data that in the baseball game, Aaron Judge of the New York Yankees is playing in the 3rd inning against Clayton Kershaw of the LA Dodgers. The available wagers include Aaron Judge of New York Yankees hitting a single at odds of 4/1, hitting a homerun at 2/1, and striking out at 2/1. Further, the base wagering module 118 may select a point of view (POV) of the live event 102. It can be noted that the POV may be selected by the user. In one embodiment, the POV may be automatically selected by a broadcaster. For example, as the camera angle changes throughout a broadcast of a live sporting event, the corresponding POV can be changed. Further, the POV can be based on the camera angles selected by the user. In one example, the broadcast of an American football game is integrating wagers available on plays inside of that game. The camera angle can change multiple times between plays in a football game. The wagers available may be sorted based on the players involved and displayed based on the point of view. When the camera shows a close up of the running back, the wagers on him running the ball on the next play may be displayed. When the camera angle shifts to the quarterback, the odds on the play being a run or a pass may be displayed, or the odds on how long his next pass would be, or other wagers associated with the player being displayed in a given camera angle. Based on the selected POV, the base wagering module 118 may filter the available wagers. In one embodiment, if the selected POV corresponds to a batter view, then the available wagers may be filtered based on the list of odds corresponding to the batter view. For example, in the baseball game, if the selected POV corresponds to a batter view, then the filtered available wagers are a wager on Aaron Judge of the New York Yankees hitting a single at odds of 4/1 and hitting a homerun at odds of 2/1. After filtering the available wagers, the base wagering module 118 may display wager options to the user. The wager options may correspond to the filtered available wagers. Further, the base wagering module 118 may determine whether the user selects to change the POV or to place a wager. In one case, if the user selects to change the POV, then the base wagering module 118 may filter available wagers again for the selected new POV. For example, from the current batter view, the user wants to change POV to the field view. In another case, if the user selects to place a wager, then the base wagering module 118 may trigger a wagering module 120. Thereafter, the base wagering module 118 may constantly monitor if the live event 102 is concluded or if the user logs-off from the wagering app 124, during the live event 102. In addition, at the end of the live event 102, the user may be prompted with a message reminder for a next live event, as a recommendation.

Further, embodiments may include the wagering module 120 which is triggered when a wager is placed by the user on the live event 102, via the base wagering module 118. After receiving the prompt from the base wagering module 118, the wagering module 120 may receive a wager from the user. For example, the user places a wager of $100 on Aaron Judge of the New York Yankees hitting a single. Further, the wagering module 120 may constantly monitor the live event 102, for completion. In one case, when the live event 102 is concluded, then the wagering module 120 may proceed to obtain the results of the live event 102. For example, the result of the live event 102 is that Aaron Judge hits a single during the live event 102. In another case, when the live event 102 is not concluded, then the wagering module 120 may continue monitoring the live event 102 for completion. Further, the wagering module 120 may compare the result of the live event 102 with the wagers placed by the user, to determine a result i.e. whether the user has won or lost. In this example, the wager of $100 placed for Aaron Judge of the New York Yankees of hitting a single and the result of the live event 102, i.e. Aaron Judge of the New York Yankees hits a single, are compared to determine the result of the wager i.e. a win for the user. Based on the comparison of the result of the live event 102 and the wagers placed by the user, the result of the wager may be used to calculate the balance amount for the user. For example, the user wins the wager of $100 placed (at odds of 4/1) on Aaron Judge hitting a single. Thus, the updated balance of the user (with an opening balance of $2000), after the completion of the live event 102, will be $2000+$400=$2400. Further, the wagering module 120 will update the account balance of the user who places the wager. In this example, after winning the wager of $100 placed (at odds of 4/1), the updated balance of the user i.e. $2400, will be updated in the user database 110. Thereafter, the process returns to the base wagering module 118.

Further, embodiments may include a mobile device 122 such as a computing device, laptop, smartphone, tablet, computer, smart speaker, or I/O devices. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers. Devices may include a combination of multiple input or output devices, including, e.g., Microsoft KINECT, Nintendo Wii mote for the WIT, Nintendo WII U GAMEPAD, or Apple IPHONE. Some devices allow gesture recognition inputs through combining some of the inputs and outputs. Some devices allow for facial recognition which may be utilized as an input for different purposes including authentication and other commands. Some devices allow for voice recognition and inputs, including, e.g., Microsoft KINECT, SIRI for IPHONE by Apple, Google Now or Google Voice Search. Additional mobile devices may have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices, display devices or group of devices may be augmented reality devices. The I/O devices may be controlled by an I/O controller. The I/O controller may control one or more I/O devices, such as, e.g., a keyboard and a pointing device, e.g., a mouse or optical pen. Furthermore, an I/O device may also allow storage and/or an installation medium for the computing device. In still other embodiments, the computing device may allow USB connections (not shown) to receive handheld USB storage devices. In further embodiments, a I/O device may be a bridge between a system bus and an external communication bus, e.g. a USB bus, a SCSI bus, a Fire Wire bus, an Ethernet bus, a Gigabit Ethernet bus, a Fiber Channel bus, or a Thunderbolt bus. Further, the mobile device 122 could be an optional component and may be utilized in a situation in which the paired wearable device is utilizing the mobile device 122 as additional memory or computing power or connection to the internet.

Further, embodiments may include the wagering app 124 which allows the user to place in-play wagers during the live event 102. In one embodiment, the wagering app 124 may be a mobile application or web application, which runs on the mobile device 122. In one embodiment, the wagering app 124 may present the user with the wagers available, related to a particular live event 102. Further, the wagering app 124 may allow the user to place in-play wagers corresponding to the available wagers. In one embodiment, the wagering app 124 may facilitate the user with an interface i.e. a graphical user interface (GUI) for performing various operations such as, but not limited to, selecting a POV for viewing the live event 102, linking other applications with the wagering app 124, storing user's personal details, etc. In one embodiment, the wagering app 124 may store information related to the placed wagers. In another embodiment, the wagering app 124 may facilitate the user to enable setting reminders related to a particular live event 102. Further, when the live event 102 concludes, the wagering app 124 may facilitate settlement of balances for the user. In another embodiment, the wagering app 124 may trigger third party balance settlement apps linked to the wagering app 124, for settlement of the balances of the user. For example, the wagering app 124 may use Paypal for settlement of the balances of the user.

FIG. 2 illustrates the odds database 116. The odds database 116 may store the list of odds associated with different POVs like, while watching a baseball game, the live event 102 may be presented in a batter view, a pitcher view, and a catcher view. In one embodiment, the live event 102 may be presented in batter view. The batter view facilitates showing odds for a batter scoring a single, double, triple, or a home run in an inning or match. For example, the first case is Aaron Judge batting against Clayton Kershaw in the third inning of a game between the New York Yankees and the Los Angeles Dodgers. Further, there are wagers for Aaron Judge hitting a single at odds of 4/1, hitting a double at odds of 5/1, and hitting a homerun at odds of 3/1. In another embodiment, the live event 102 may be presented in pitcher view. The pitcher view facilitates showing odds for a pitcher scoring a number of strikeouts in an inning or match. For example, in a case, Clayton Kershaw pitching against Aaron Judge, getting a strikeout at odds of 4/1. In another embodiment, the live event 102 may be presented in the catcher view. The catcher view facilitates showing odds for a catcher catching, scoring a run, most runs batted in, in an inning or match. For example, in a case, Clayton Kershaw getting a catch at odds of 3/1, scoring a run at odds of 2/1, and scoring most runs batted at odds of 3/1. In another embodiment, the live event 102 may be presented in the field view. The field view facilitates showing odds for a batter scoring a single, a batter scoring a homerun, or a catcher catching, in an inning or match. For example, in a case, Aaron Judge scoring a single at odds of 4/1, scoring a homerun at odds of 5/1, and getting a catch at odds of 3/1. Further, in another embodiment, the odds database 116 may store the list of odds associated with different POVs like, while watching a cricket game, the live event 102 may be presented in a stump view, a bowler view, and a field view. In one embodiment, the live event 102 may be presented in stump view. The stump view facilitates showing odds for a batsman scoring a single, double, or a six in an inning or a match. For example, the first case is Virat Kohli of India, playing in the second inning against the Mitchell Starc of Australia, with wagers for hitting a single at odds of 2/1, hitting a double at odds of 4/1, and hitting a six at odds of 3/1. In one embodiment, the live event 102 may be presented in bowler view. The bowler view facilitates showing odds for a bowler taking a wicket or bowling a dot ball or a maiden over in an innings or a match. For example, Mitchell Starc getting a wicket at odds of 2/1, bowling a dot ball at odds of 3/1, and bowling a maiden over at odds of 4/1. In one embodiment, the live event 102 may be presented in field view. The field view facilitates showing odds for a fielder taking a catch or doing a misfield or a direct throw in an innings or a match. For example, Mitchell Starc getting a catch at odds of 4/1, doing a misfield at odds of 2/1, and scoring a direct throw at odds of 3/1.

Figure 3:
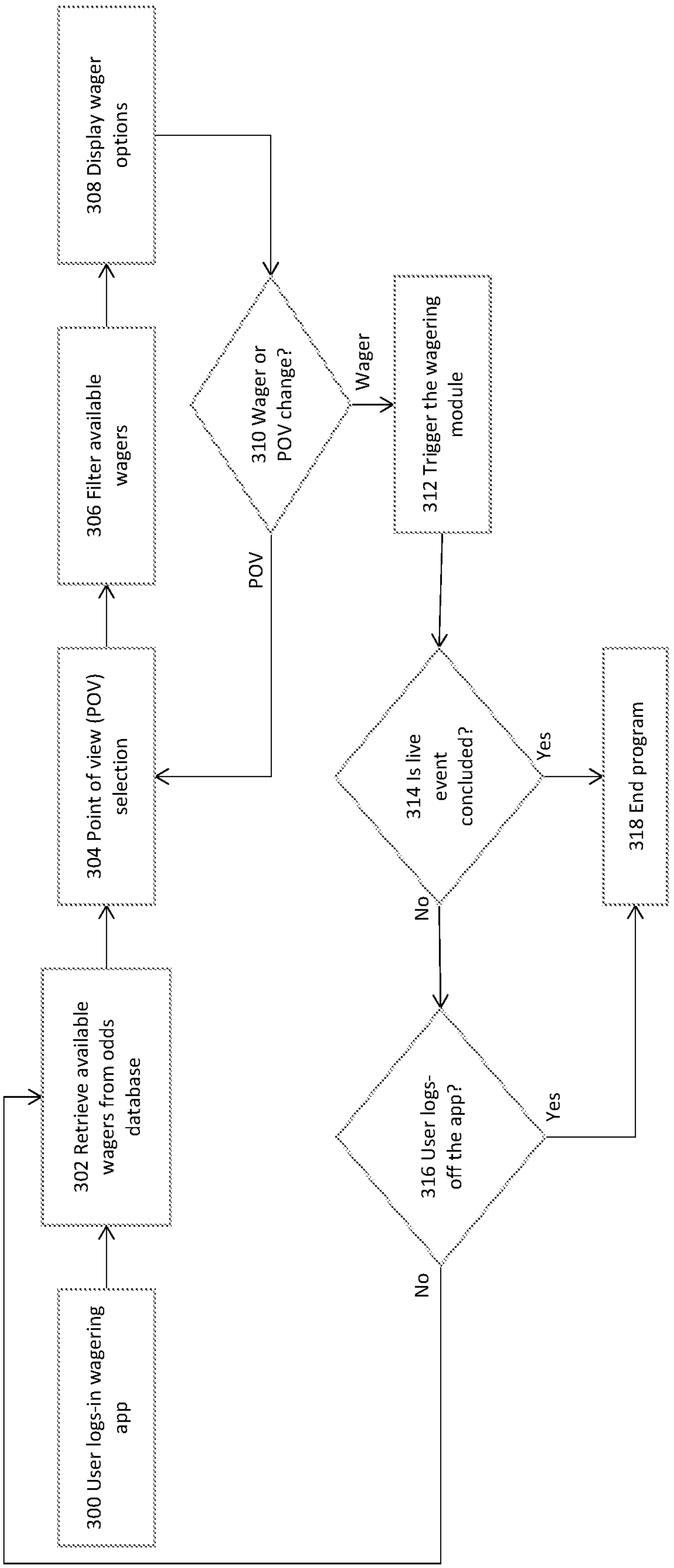
FIG. 3 illustrates a base wagering module, according to an embodiment.

FIG. 3 illustrates the base wagering module 118. The base wagering module 118 is triggered when the user logs-in, at step 300, to the wagering network 108 through the wagering app 124, on the mobile device 122. The base wagering module 118 may facilitate the user to access the live event 102 and place in-play wagers. After logging in to the wagering app 124, the base wagering module 118 may retrieve, at step 302, the available wagers from the odds database 116. For example, in the baseball game, Aaron Judge is batting against Clayton Kershaw in the third inning of a game between the New York Yankees and the Los Angeles Dodgers. Further, there are wagers for Aaron Judge hitting a single at odds of 4/1, hitting a double at odds of 5/1, and hitting a homerun at odds of 3/1. In this example, Mookie Betts of the Los Angeles Dodgers catches a ball at odds of 5/1. Further, the base wagering module 118 may select, at step 304, a point of view (POV) of the live event 102. It can be noted that the POV may be selected by the user. In one embodiment, the POV may be automatically selected by a broadcaster. For example, while watching a baseball game, the live event 102 may be presented in a field view, a batter view, a pitcher view, and a catcher view. In this example, the user selects the batter view. Based on the selected POV, the base wagering module 118 may filter, at step 306, the available wagers. In one embodiment, if the selected POV corresponds to a batter view, then the available wagers may be filtered based on the list of odds corresponding to the batter view. For example, in the baseball game, if the selected POV corresponds to a batter view, then the filtered available wagers are Aaron Judge hitting a single at odds of 4/1 and hitting a homerun at odds of 2/1. After filtering the available wagers, the base wagering module 118 may display, at step 308, wager options to the user. The wager options may correspond to the filtered available wagers related to the select POV. For example, Aaron Judge hitting a single at odds of 4/1 and hitting a homerun at odds of 2/1, are displayed to the user. Further, the base wagering module 118 may determine, at step 310, whether the user selects to change the POV or to place a wager. In one case, if the user selects to change the POV, then the base wagering module 118 may return to step 304, to select a new POV. For example, from the current batter view, the user wants to change POV to the field view. In another case, if the user selects to place a wager, then the base wagering module 118 may trigger the wagering module 120. Based on the determination that the user selects to place the wager, the base wagering module 118 may trigger, at step 312, the wagering module 120. Thereafter, the base wagering module 118 may constantly monitor, at step 314, the live event 102 for completion. In one case, when the live event 102 is concluded, then the base wagering module 118 may again trigger the wagering module 120, to conclude on the wagers placed by the user. In another case, when the live event 102 is not concluded, then the base wagering module 118 may return to step 302 to retrieve available wagers. The base wagering module 118 may also constantly monitor, at step 316, if the user logs-off from the wagering app 124, during the live event 102. In one case, when the user logs-off from the wagering app 124, then the base wagering module 118 may again trigger the wagering module 120, to conclude on the wagers placed by the user. In another case, when the user does not logs-off from the wagering app 124, then the base wagering module 118 may return to step 302 to retrieve available wagers. Thereafter, the program ends, at step 318.

Figure 4:
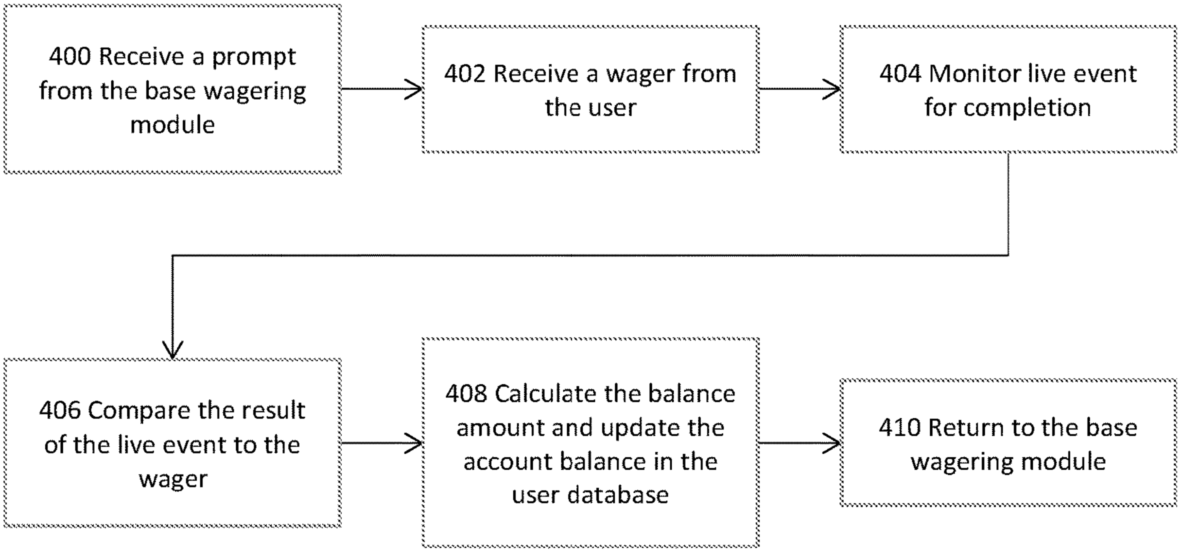
FIG. 4 illustrates a wagering module, according to an embodiment.

FIG. 4 illustrates the wagering module 120. The wagering module 120 may receive, at step 400, a prompt from the base wagering module 118. It can be noted that the wagering module 120 is triggered when the user wants to place a wager during the live event 102. For example, a user wants to place a wager of $100 on Aaron Judge hitting a single at odds of 4/1. The wagering module 120 may receive, at step 402, a wager from the user. For example, the user places a wager of $100 on Aaron Judge hitting a single. Further, the wagering module 120 may constantly monitor, at step 404, the live event 102, for completion. In one case, when the live event 102 is concluded, then the wagering module 120 may proceed to obtain the results of the live event 102. For example, the result of the live event 102 is that Aaron Judge hits a single during the live event 102. In another case, when the live event 102 is not concluded, then the wagering module 120 may continue monitoring the live event 102 for completion. Further, the wagering module 120 may compare, at step 406, the result of the live event 102 with the wagers placed by the user, to determine a result i.e. whether the user has won or lost. In this example, the wager of $100 placed for Aaron Judge hitting a single and the result of the live event 102 i.e. Aaron Judge hits a single, are compared to determine the result of the wager i.e. a win for the user. Based on the comparison of the result of the live event 102 and the wagers placed by the user, the wagering module 120 may calculate, at step 408, the balance amount for the user. For example, the user wins the wager of $100 at 4/1 odds that Aaron Judge will hit a single on the next play and the result of the live event 102 is Aaron Judge hits a single. Thus, the updated balance of the user (with an opening balance of $2000), after the completion of the live event 102, will be $2000+$400=$2400. Further, the wagering module 120 may update, at step 408, the account balance of the user who places the wager in the user database 110. In this example, after winning the wager of $100 placed (at odds of 4/1), the updated balance of the user i.e. $2400. Thereafter, the process returns, at step 410, to the base wagering module 118.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method of providing a wager, through a software application on a display device, on a prediction of an action in a sporting event, the method comprising:
- receiving data, via the software application, from a sporting event upon which wagers are placed on actions inside of that sporting event;
- storing, in an odds database, odds for actions in the sporting event; and
- displaying one or more first wagers based on a point of view in the display device during display of the sporting event;
- wherein a change in a point of view of a display of the sporting event on the display device triggers a change from displaying the one or more first wagers presented on the display device to displaying one or more second wagers presented on the display device.

2. The method of providing a wager of claim 1, further comprising changing the point of view of the display of the sporting event on the display device by selecting a different point of view.

3. The method of providing a wager of claim 1, further comprising filtering a list of available wagers available based on the point of view of the display of the sporting event on the display device from a list of available wagers on an action in the sporting event in the received data.

4. The method of providing a wager of claim 1, further comprising automatically changing the point of view based upon a camera view providing the video fee to the display of the sporting event.

5. A method of displaying available wagers for an action in a sporting event, comprising executing on a processor the steps of:
- displaying a sporting event on a display device;
- displaying, on the display device, one or more first wagers based upon a point of view of the displayed sporting event in the display device; and
- displaying one or more second wagers when there is a change in the point of view of the display of the sporting event in the display device.

6. The method of displaying available wagers for an action in a sporting event of claim 5, further comprising displaying one or more options to change the point of view of the displayed sporting event.

7. The method of displaying available wagers for an action in a sporting event of claim 5,
- wherein the one or more available first wagers are different from the one or more available second wagers.

8. A system for wagering on an action in a sporting event, comprising:
- a display device that displays a sporting event;
- an odds database that stores wagers for actions in the sporting event, the wagers associated with a point of view of the displayed sporting event on the display device; and
- one or more first wagers presented on the display device based on the point of view of the displayed sporting event on the display device; and
- one or more alternative wagers displayed on the display device when there is a change of perspective of the live sporting event on the display device.

* * * * *